(12) United States Patent
Common

(10) Patent No.: US 7,991,824 B2
(45) Date of Patent: Aug. 2, 2011

(54) SECURE COMPUTER WORKING ENVIRONMENT UTILIZING A READ-ONLY BOOTABLE MEDIA

(75) Inventor: Thomas E. Common, Centennial, CO (US)

(73) Assignee: Teletech Holdings, Inc., Englewood, CO (US)

( * ) Notice: Subject to any disclaimer, the term of this patent is extended or adjusted under 35 U.S.C. 154(b) by 507 days.

(21) Appl. No.: 11/845,874

(22) Filed: Aug. 28, 2007

(65) Prior Publication Data
US 2009/0063685 A1 Mar. 5, 2009

(51) Int. Cl.
*G06F 15/16* (2006.01)
(52) U.S. Cl. .................. 709/202; 709/212; 709/220
(58) Field of Classification Search .......... 709/202, 709/212, 220
See application file for complete search history.

(56) References Cited

U.S. PATENT DOCUMENTS

| | | | |
|---|---|---|---|
| 5,842,011 A * | 11/1998 | Basu | 713/2 |
| 6,826,710 B2 * | 11/2004 | Merkin et al. | 714/6 |
| 7,089,300 B1 * | 8/2006 | Birse et al. | 709/221 |
| 7,233,985 B2 * | 6/2007 | Hahn et al. | 709/222 |
| 7,251,725 B2 * | 7/2007 | Loison et al. | 713/1 |
| 2004/0128493 A1 | 7/2004 | Zimmer et al. | 713/1 |
| 2005/0149481 A1 | 7/2005 | Hesselink et al. | 707/1 |
| 2005/0177380 A1 | 8/2005 | Pritchard et al. | 705/1 |
| 2006/0031547 A1 * | 2/2006 | Tsui et al. | 709/231 |
| 2007/0180509 A1 | 8/2007 | Swartz et al. | 726/9 |
| 2007/0192580 A1 * | 8/2007 | Challener et al. | 713/2 |
| 2008/0016178 A1 * | 1/2008 | Portugali | 709/217 |

OTHER PUBLICATIONS

Remote Agents Come Together With CallCast, Allison Taylor, Network World Canada (Aug. 8, 2003), http://www.itworldcanada.com/a/Daily-News/89c310e7-9358-431c-a52f-e2d8e5454ab5.html.
Lee W. Young; International Search Report and Written Opinion; Jun. 25, 2009.

* cited by examiner

*Primary Examiner* — Phuoc Nguyen
(74) *Attorney, Agent, or Firm* — Stanley J Gradisar Attorney At Law LLC; Stanley J. Gradisar

(57) ABSTRACT

A read-only bootable media is provided in which a remote agent loads the read-only bootable media onto a computer. The read-only bootable media provides a customized operating system that is run in the computer's volatile memory. The read-only media also disables any persistent storage connected to the agent computer or devices connected to the agent computer. This protects the agent's computer and any networks that the agent connects to from malicious software. Also, by disabling persistent storage, confidential information is protected from unauthorized retention by the agent.

19 Claims, 6 Drawing Sheets

SECURE COMPUTER WORKING ENVIRONMENT UTILIZING A READ-ONLY BOOTABLE MEDIA

BACKGROUND

In some businesses, it is beneficial for a company to employ a dispersed workforce. The dispersed work force allows the company to hire qualified candidates around the country, or even the world. Additionally, a dispersed workforce allows a company to save money on office space and supplies because the company's employees will be able to work from their home. Further advantages include reductions in costs associated with office supplies, equipment, furniture, phones and phone lines, etc. Employees also prefer such an arrangement because it provides savings in gas and/or transit costs to and from work as well as the time in commuting.

A dispersed workforce arrangement is particularly suited for companies offering phone-in customer service. In this industry, it is often unnecessary to require employees to work from 15 an office because the employees can provide customer support from their home. In these situations, employees simply log on to the company's network to access the information and the resources necessary to aid customers. However, in a dispersed workforce, employers lose the ability to monitor employees to make sure that they are actually working. Additionally, employers have no way of ensuring that their employees are not retaining confidential customer information, such as social security numbers, credit card numbers, etc. Finally, because the employees are logging in to the company network using their own computers, the company network becomes susceptible to any viruses or spy ware located on the employee's computer.

In an effort to avoid these problems, companies have provided remote employees with computers to use specifically for work purposes. Providing each employee with their own computer can be very costly, and it is often difficult for the company to retrieve the computer when an employee leaves the company. Furthermore, the companies have no way of ensuring that their employees only use the provided computer for work purposes or ensure that their employees are not retaining or misusing confidential customer information. Thus, providing computers specifically for work purposes does not solve these problems.

It is with respect to this general environment that embodiments of the present invention have been contemplated.

SUMMARY

Embodiments of the present invention are directed to systems and methods for providing a secure working environment at a remote agent's computer. The remote agent's computer is secured using a read-only bootable media that provides a customized and secure operating system. The customized operating system disables the remote agent's persistent memory to ensure that any viruses on the remote agent's computer cannot be transferred to the customer service provider's network. Furthermore, by disabling the computer's persistent storage, the remote agent is not able to save confidential client information.

In one embodiment, the read-only bootable media provides a secure connection to a customer service provider's network by establishing a virtual private network ("VPN") tunnel in which the remote agent's computer can communicate with the customer service provider's network. The VPN tunnel allows the remote agent's computer to access data on the customer service provider's servers without the use of an open network, such as the Internet, where the computer is susceptible to a virus. Furthermore, the read-only bootable media provides additional protection to the customer service provider's network by ensuring that a virus cannot be transferred from the remote agent's computer to the network.

Further, the customizable operating system provided by the read-only bootable media removes the remote agent's ability to surf the Internet, chat online, or play video games on his or her computer. As such, the remote agent cannot be distracted by these things and is more likely to perform his or her duties in an unsupervised environment.

In another embodiment, the read-only bootable media provides a working environment in which the remote agent's supervisors can supervise the remote agent's work. Additionally, the customizable operating system provides a supervisor with the ability to take control of the agent's computer to provide help and/or training to the agent.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Embodiments of the present invention may be more readily described by reference to the accompanying drawings in which like numbers refer to like items and in which.

DETAILED DESCRIPTION

Figure 1:
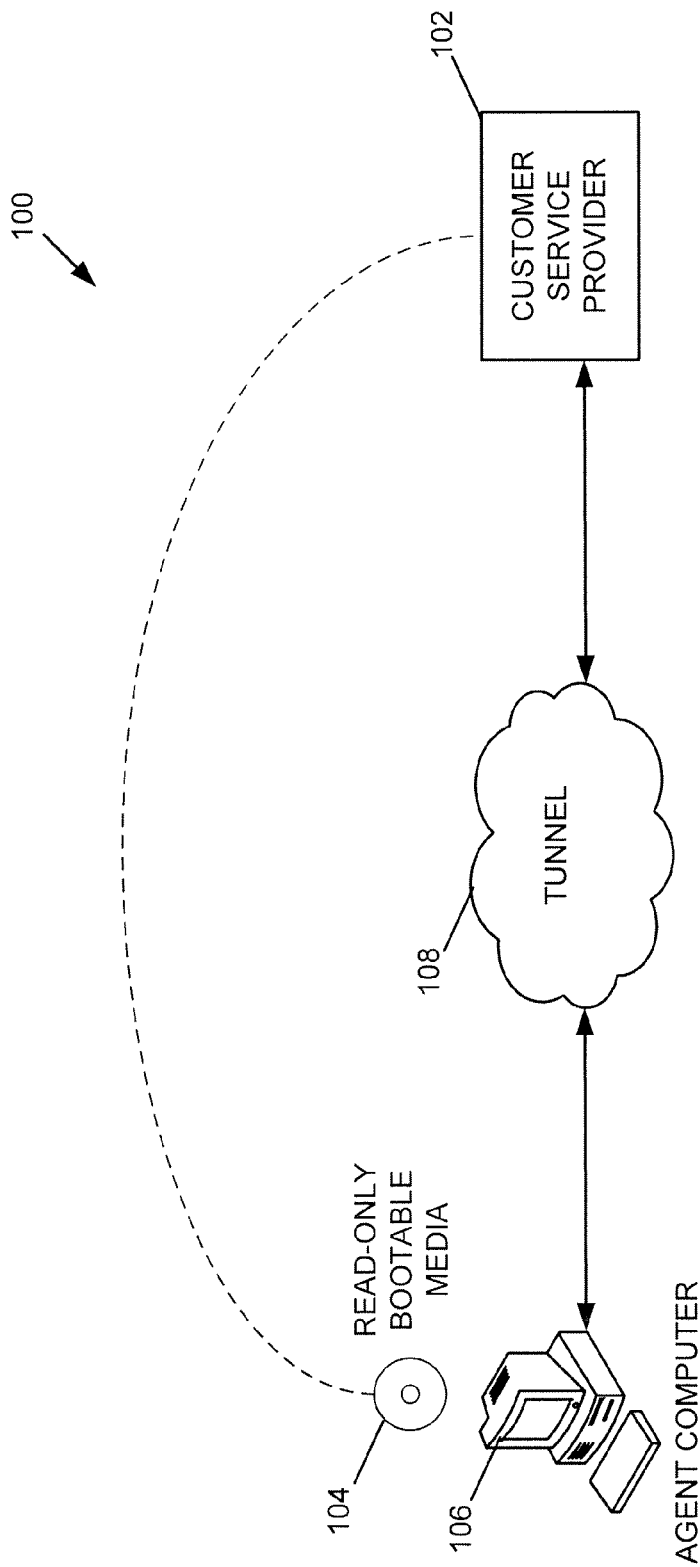
FIG. 1 is a block diagram of an embodiment of a system for providing a secure working environment for remote employees.

This disclosure will now more fully describe exemplary embodiments with reference to the accompanying drawings, in which some of the possible embodiments are shown. Other aspects, however, may be embodied in many different forms and the inclusion of specific embodiments in the disclosure should not be construed as limiting such aspects to the embodiments set forth herein. Rather, the embodiments depicted in the drawings are included to provide a disclosure that is thorough and complete and which fully conveys the intended scope to those skilled in the art. When referring to the figures, like structures and elements shown throughout are indicated with like reference numerals.

Embodiments of the present invention are generally directed to providing a secure working environment on a remote agent's computer. In one embodiment, a read-only bootable media is provided to a remote agent. The read-only bootable media is loaded on to the remote agent's computer to provide a secure working environment in which the remote agent can safely and securely log on to a customer service provider's network. It should be noted that nothing is installed on the remote agent's computer in this process. No permanent changes are made to the remote agent's computer. This is because the basic input-output system ("BIOS") of the remote agent's computer is in the read only memory of the remote agent's computer. The BIOS runs the operating system from the read-only bootable media in the read only memory of the agent's computer. In some embodiments, a secure environment is one that is resistant to, limits the function of, and/or limits the transfer of viruses, spy ware, malware, or other malicious software, undesirable interactions between one or more pieces of software, or software with bugs or other erratic behavior.

In other embodiments, the read-only bootable media provides a working environment in which the customer service provider can protect confidential information, for example, a customer's social security number or credit card number, from an agent's misuse. In yet another embodiment, the read-only bootable disk allows a supervisor located at the customer service provider's facility or at a geographically separate location to take control of the remote agent's computer to provide help and/or training to the remote agent.

An embodiment of a system 100 for providing a secure working environment for remote employees is shown in FIG. 1. In some embodiments, a customer service provider 102 delivers a read-only bootable media 104 to an agent. The customer service provider 102 may be a business that provides service to customers in the form of answering questions, troubleshooting problems, resolving issues, sales, or any other type of service. A customer may be any person that interacts with the customer service provider 102, which may include, but is not limited to, people purchasing a product, a former purchaser asking for assistance, a supplier, or a person interested in a product. Customer service provider 102, in some embodiments, provides service to customers via agents that may be located at customer service provider's 102 facility or at a geographically separate location, for example, the agent's home. In some embodiments, read-only bootable media 104 is delivered by any means that provides the media to the agent, which may include, but is not limited to, government or private mail delivery, hand delivery, agent pick up, or via the Internet in which the agent can download and transfer to a tangible computer readable media. Read-only bootable media 104 may take the form of a DVD-ROM, CD-ROM, a read-only diskette, a read-only flash drive, a read-only hard drive, or any other type of tangible read-only computer media. In some embodiments, the agent may be able to write to the read-only computer media but will not be able to alter the secure desktop software stored on the media. When working remotely from the customer service provider 102, the agent loads the read-only bootable media 104 onto an agent computer 106. The agent computer 106 then communicates through a tunnel 108 with the customer service provider 102. In some embodiments, the tunnel 108 is a secure communications connection such as a virtual private network ("VPN") connection. In other embodiments, the tunnel 108 is any other type of security enhanced communication connection which may include, but is not limited to, a secure protocol such as transport layer security ("TLS"), secure sockets layer ("SSL"), secure hypertext transfer protocol ("SHTTP"), or any other type of secure communications connection known in the art. The agent computer 106, in some embodiments, communicates with, receives data from, and transfers data to the customer service provider 102 via the tunnel 108.

In further embodiments, the customer service provider 102 assumes control of the agent computer 106 after the secure operating environment is established. Virtual Network Computing ("VNC") Viewer and Server can be utilized for this function, as well as other tools known in the art. In some embodiments, the customer service provider 102 assumes control by transferring instructions to the agent computer 106 via the tunnel 108. In some embodiments, the instruction types include, but are not limited to, a Remote Procedure Call ("RPC"), electronic messages, e.g., Extensible Markup Language ("XML") or Hypertext Transfer Protocol ("HTTP") messages. The instructions may contain software for execution upon the agent computer 106, or may comprise other methods of remotely controlling a computer as is known in the art.

Figure 2:
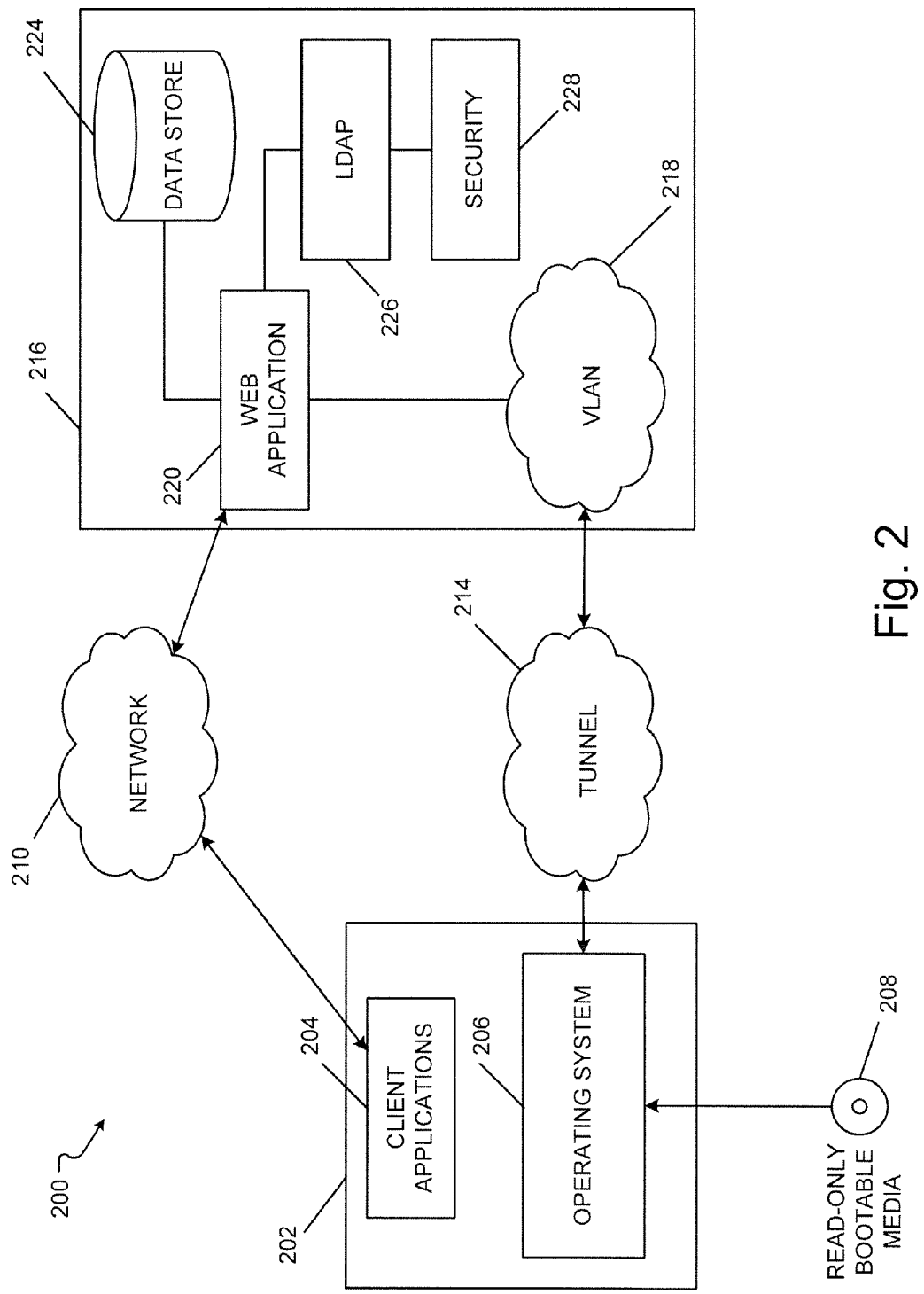
FIG. 2 is a block diagram of an embodiment of a system for providing a secure connection between a remote agent's computer and a customer service provider.

In another embodiment, a system 200 for providing a secure connection between a remote agent computer 202 and a customer service provider 216 is shown in FIG. 2. A read-only bootable media 208 is loaded onto the remote agent computer 202 to create a secure working environment. The secure working environment includes, but is not limited to, an operating system 206 and client applications 204. In some embodiments, the operating system 206 is a customized operating system configured to perform functions necessary for the agent's required work. For example, the operating system 206 in an another embodiment can be further customized by providing enhanced security features, modifying the operating system's security model, or ensuring that the system 216, rather than the agent, has control over the agent's operations on remote agent computer 202. In other embodiments, the operating system 206 may be a standard operating system such as Microsoft® Windows XP®, Microsoft® Vista®, Mac OSX, Linux, or any other type of operating system.

In some embodiments, the one or more client applications 204 comprise software applications, which may include, but are not limited to, chat applications, security applications, help tools, and applications to allow customer service provider 216 to take over and control remote agent computer 202. In other embodiments, client applications 204 may comprise other software applications, for example, word processors, spread sheet applications, email applications, or any other type of software applications that the agent needs in order to provide service to a customer. In further embodiments, the one or more client applications 204 may include an application for allowing voice communications over remote agent computer 202. The voice application provides the benefit of allowing the agent to speak with customers without requiring the agent to have a separate telephone line or connection.

Once operating system 206 and client applications 204 have been loaded onto remote agent computer 202 from read-only bootable media 208 and are running, client applications 204 connect to a web application 220 located at customer service provider 216. In other embodiments, web application 220 may be located on a computer or other electronic device located on the premises of customer service provider 216. In yet another embodiment, web application 220 may be located on a server, computer, or other electronic device located geographically separate from customer service provider 216 but under the control of customer service provider 216. Client applications 204 connect to web application 220 via a network 210, such as the Internet, for example. In other embodiments, client applications 204 is connected to web application 220 through a local area network ("LAN"), a wide area network ("WAN"), a wireless area network, or any other type of network known in the art.

Web application 220 performs authentication on the agent and/or the remote agent computer 202. In some embodiments, authentication may include, but is not limited to, requiring the agent to enter a password, use a smart card, provide a finger print or retinal scan, or perform any other form of authentication known to the art. The web application 220, in some embodiments, verifies the authentication information from the remote agent computer 202 against information contained in an LDAP server 226. In some embodiments, web application 220 is in communication with LDAP server 226. LDAP server 226 contains security information 228. In other embodiments, security information 228 may be stored on a separate server or database that communicates with LDAP server 226. Security information 228 includes security information with which web application 220 can compare to the authentication information provided by remote agent computer 202 in order to check the veracity of the agent provided authentication information.

In other embodiments, security information 228 may also comprise a security protocol for establishing secure communication with remote agent computer 202, or any other type of security information known to the art. Once the remote agent computer 202 has been authenticated, web application 220 establishes a tunnel 214 over which remote agent computer 202 can securely communicate with customer service provider 216. In some embodiments, all communications and data transfers, occurring after authentication, between remote agent computer 202 and customer service provider 216 will take place via tunnel 214.

In some embodiments, tunnel 214 connects to a virtual local area network ("VLAN") 218. VLAN 218 provides remote agent computer 202 access to specific servers in communication with web application 220, LDAP server 226, security information 228, and/or a data store 224 specifically associated with an agent's group. For example, customer service provider 216 may have various different working groups, such as sales, customer service, etc. Remote agents may be assigned to a specific working group. If an agent using remote agent computer 202 is a member of the sales group, VLAN 218 will create a virtual network in which the remote agent computer 202 can only access servers and information specific to its group, i.e., only severs and information associated with the sales group. VLAN 218 provides additional security by giving agents access to only the information that they need to know and by essentially providing quarantine as an additional security feature in case a virus or other malicious software enters the customer service provider 216 network via remote agent computer 202. Once remote agent computer 202 is connected to VLAN 218, remote agent computer 202 can access the specific web application(s) 220 and data store 224 that the agent needs to perform his or her duties. In some embodiments, data store 224 comprises customer information which may include, but is not limited to, customer contact information, billing information, product information, store information, or any other type of information needed to provide service.

Figure 3:
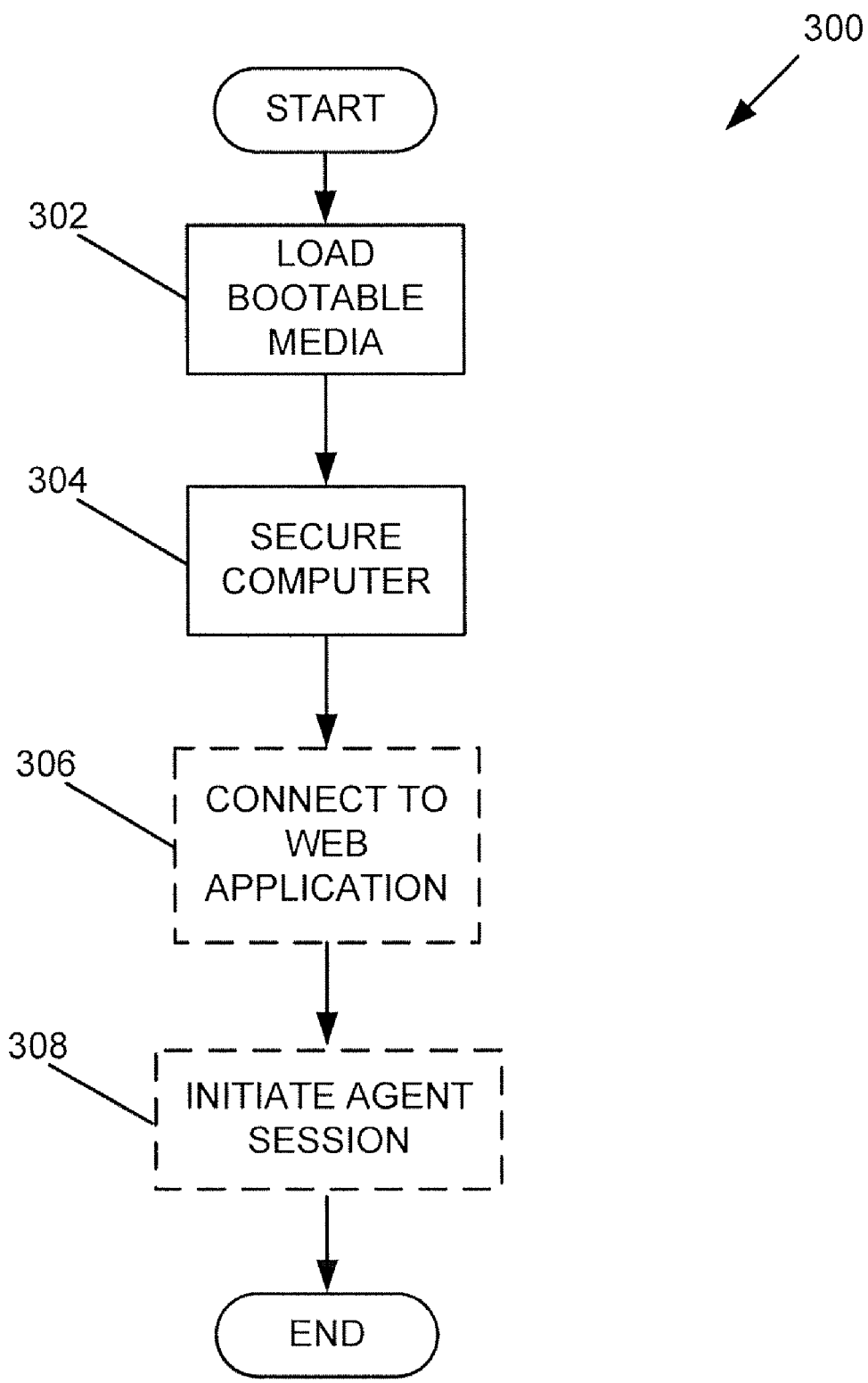
FIG. 3 is a flow diagram representing an embodiment of a method for providing a remote agent with a secure working environment.

An embodiment of a method 300 for providing a remote agent with a secure working environment is shown in FIG. 3. The load bootable media operation 302 loads read-only bootable media, such as read-only bootable media 104 (FIG. 1) or read-only bootable media 208 (FIG. 2) onto a computer. In one embodiment, an agent loads the read-only bootable media onto an agent computer, such as agent computer 106 (FIG. 1) or remote agent computer 202 (FIG. 2). The read-only bootable media may be loaded onto the agent's computer via an input device, which may include, but is not limited to, a CD-ROM drive, a USB port, a disk drive, or any other device in communication with the agent computer and capable of reading the read-only bootable media. In some embodiments, the read-only bootable media can be loaded upon start-up of the agent's computer. In other embodiments, the read-only bootable media is loaded after the agent's computer has already started up. In such embodiments, the read-only bootable media would cause the agent's computer to restart. The net result of either embodiment is the same.

The secure computer operation 304 loads the set of computer instructions contained on the read-only bootable media. In some embodiments, the computer instructions cause the agent's computer to start-up or run in a secure mode. The secure mode is resistant to, limits the function of, and/or limits the transfer of viruses, spy ware, malware, or other malicious software, undesirable interactions between one or more pieces of software, or software with bugs or other erratic behavior. Thus, the computer is placed into a state in which it will less likely be harmed or harm other computers or servers with which it may communicate. An embodiment of the secure computer operation 304 is described in further detail below with reference to FIG. 4.

After secure computer operation 304, in some embodiments, optional connect to web application operation 306 (shown with dashed lines) connects remote agent computer 106, 202 to a web application, such as web application 220 (FIG. 2). In such embodiments, remote agent computer 106, 202 establishes communications with a web application, such as web application 220 (FIG. 2) located at customer service provider 216 (FIG. 2). In another embodiment, the network communications between remote agent computer 106, 202 and web application 220 occur over a secure communications link, such as tunnel 214 (FIG. 2), a VPN, or any other secure communications connection known in the art. In other embodiments, connecting to web application 220 occurs over a network such as the Internet, a LAN, a WAN, or a wireless area network. In these embodiments, communications between remote agent computer 106, 202 and web application 220 may use a security protocol, for example, SHTTP, a standard communications protocol, for example, HTTP, or any other communications protocol known in the art. Once remote agent computer 106, 202 has connected with web application 220, remote agent computer 106, 202 may download client applications, such as client applications 204 (FIG. 2), from web application 220. In other embodiments, remote agent computer 106, 202 downloads content, data, security protocols, or other types of electronic transmissions containing useful or functional data from web application 220. In yet another embodiment, web application 220 provides authentication and/or authorization services to remote agent computer 106, 202 to ensure that it has access to protected information. An additional embodiment of connect to web application operation 306 is further described below with reference to FIG. 5.

In some embodiments, flow proceeds to optional initiate agent session operation 308 (shown with dashed lines). Initiate agent session operation 308 initiates a session that allows remote agent computer 106, 202 to access information necessary to perform the agent's job function associated with the customer service provider. This information may be stored at a remote data store, such as data store 224 (FIG. 2), on a remote server, or contained in a web application, such as web application 220 (FIG. 2). In other embodiments, initiate agent session operation 308 may provide a secure connection, such as tunnel 214 (FIG. 2), between remote agent computer 106, 202, and a customer provider, such as customer service provider 102, 216.

Figure 4:
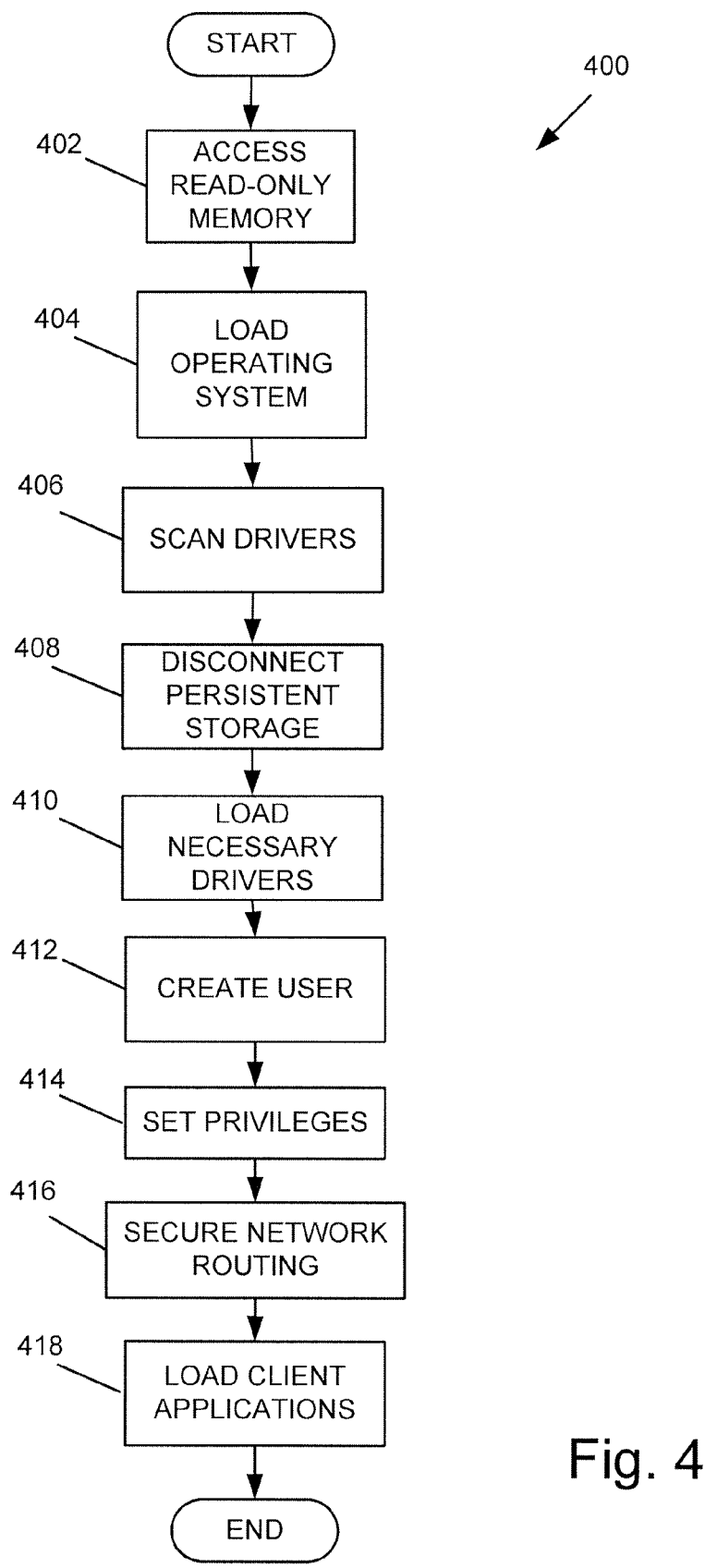
FIG. 4 is a flow diagram representing an embodiment of a method for securing a remote agent's computer.

An embodiment of a method 400 for securing a remote agent's computer is shown in FIG. 4. Access read-only memory operation 402 accesses a read-only bootable media, such as read-only bootable media 104 (FIG. 1) or read-only bootable media 208 (FIG. 2). In some embodiments, remote agent computer 106, 202 accesses read-only bootable media 104, 208 that contains computer readable instructions for performing the steps of providing a secure operating environment. Remote agent computer 106, 202 follows the instructions on read-only bootable media 104, 208 at start-up. A secure operating environment, in some embodiments, is resistant to, limits the function of, and/or limits the transfer of viruses, spy ware, malware, or other malicious software, undesirable interactions between one or more pieces of software, or software with bugs or other erratic behavior. In alternate embodiments, the malicious software cannot function and cannot be transferred to customer service provider's 102, 216 network.

Load operating system operation 404 loads an operating system from read-only bootable media 104, 208. In some embodiments, the operating system is a customized operating system that provides only the functionality necessary for the agent to do his or her job plus additional security features. An example of such an operating system is a customized version of Linux Knoppix. In other embodiments, the customized operating system may be a version of Windows®, Mac OSX, Linux, Unix, or any other commercially available or non-commercial customizable operating system. In yet another embodiment, a non-customizable operating system may be used. In other embodiments, read-only bootable media 104, 208 will also load an X Server and window manager, Fluxbox for example, available for download on the Internet, for providing windowing capabilities. Load operating system operation 404 may occur at start-up or upon rebooting of remote agent computer 106, 202. This reboot or start-up procedure ensures that any viruses contained in remote agent computer 106, 202 random access memory ("RAM") are expunged from the computer because the memory is erased during a reboot or is empty at start-up.

Scan drivers operation 406 scans the available drivers on remote agent computer 106, 202. In some embodiments, scanning remote agent computer 106, 202 drivers comprises identifying all attached drivers used with internal or external devices in communication with the processor of remote agent computer 106, 202. Drivers may be software used to interact with computer hardware, which may include, but is not limited to, hard drives, random access memory, a keyboard, a mouse, a printer, CD-ROM drives, DVD/DVR drives, diskette drives, external hard drives, flash drives, etc. In alternate embodiments, a driver may be software used to interact with a cell phone, a PDA, or any other type of electronic component in electrical communication with remote agent computer 106, 202.

In one embodiment, after identifying the drivers, all drivers for electrical components with persistent memory storage, e.g., drivers for hard drives, flash drives, printers, or any other type of electrical component with a persistent memory. For example, devices with non-volatile storage are disabled in disconnect persistent storage operation 408. Disconnect persistent storage operation 408 disconnects all persistent storage to ensure that any spy ware, malware, or any other malicious software located on remote agent computer 106, 202 cannot function and cannot be transferred to customer service provider's 102, 216 network to damage the network. Malicious software may include software loaded on remote agent computer 106, 202 that can damage customer service provider's 102, 216 network and/or access confidential client information. The malicious software must necessarily reside in remote agent computer 106, 202 persistent memory because any malicious software located in remote agent computer 106, 202 RAM would be expunged during the rebooting process. Thus, disconnect persistent storage operation 408 provides protection to remote agent computer 106, 202, customer service provider 102, 216, and confidential client information, such as client information located on data store 224, from malicious software and hardware located on remote agent computer 106, 202. Furthermore, by disabling drivers with persistent storage and printers, confidential client information is protected from unauthorized retention by the agent.

Load necessary drivers operation 410 loads all drivers necessary for the agent to perform his or her job. In some embodiments, such drivers include drivers for keyboards, monitors, mice, network drivers, or any other drivers for components necessary for the agent to perform his or her job. In one embodiment, none of these devices have persistent storage.

Create user operation 412 creates a user profile for the agent. In some embodiments, the user profile is used to identify the agent on remote agent computer 106, 202. This identity may be used to authenticate and authorize the agent when establishing communication with the customer service provider, such as customer service provider 102, 216. In other embodiments, the user profile acts as an identifier for actions taken on remote agent computer 106, 202. Identifier information may be used by customer service provider 216 for tracking the agent's performance, monitoring the agent during work, providing training services to the agent, or for any other monitoring purposes. In other embodiments, creating a user profile will allow the agent access to the secure operating environment created by read-only bootable media 104, 208.

Set privileges operation 414 sets the privileges for the user profile created in conjunction with the create user operation 412. In some embodiments, the user is unable to exit the graphical user interface ("GUI") to access the root directory. Thus, the user is limited to interactions with the GUI. This constraint maintains the integrity of the customizable operating system loaded in operation 404 by disallowing the user from changing the system settings.

Secure network routing operation 416 places network access restrictions upon remote agent computer 106, 202. In some embodiments, the network restrictions limit remote agent computer 106, 202 to accessing customer service provider's 216 network, such as VLAN 218 (FIG. 2). The network restrictions prevent remote agent computer 106, 202 from accessing public web sites, web mail, and other network persistent media that could be used to store customer or client information. In some embodiments, IP routing rules are established which block non-work network traffic from leaving remote agent computer 106, 202. For example, all network messages addressed to URLs not associated with the work network are blocked from transmission.

Load client applications operation 418 loads client applications onto remote agent computer 106, 202. Client applications, such as client applications 204 (FIG. 2) may comprise software applications, which may include, but is not limited to, chat applications, security applications, help tools, applications to allow customer service provider 102, 216 to take over and control remote agent computer 106, 202, etc. In some embodiments, client applications 204 are other software applications which may include, but is not limited to, word processors, spread sheet applications, email applications, or any other type of software applications that the agent may need to provide service to a customer. In some embodiments, client applications 204 may be loaded onto remote agent computer 202 from read-only bootable media 208. In an alternate embodiment, the client applications 204 are downloaded onto remote agent computer 202 via a network connection to a web application, such as web application 220

(FIG. 2), under the control of customer service provider 216. In yet another embodiment, the client applications may be provided by both read-only bootable media 208 and a web application 220.

Figure 5:
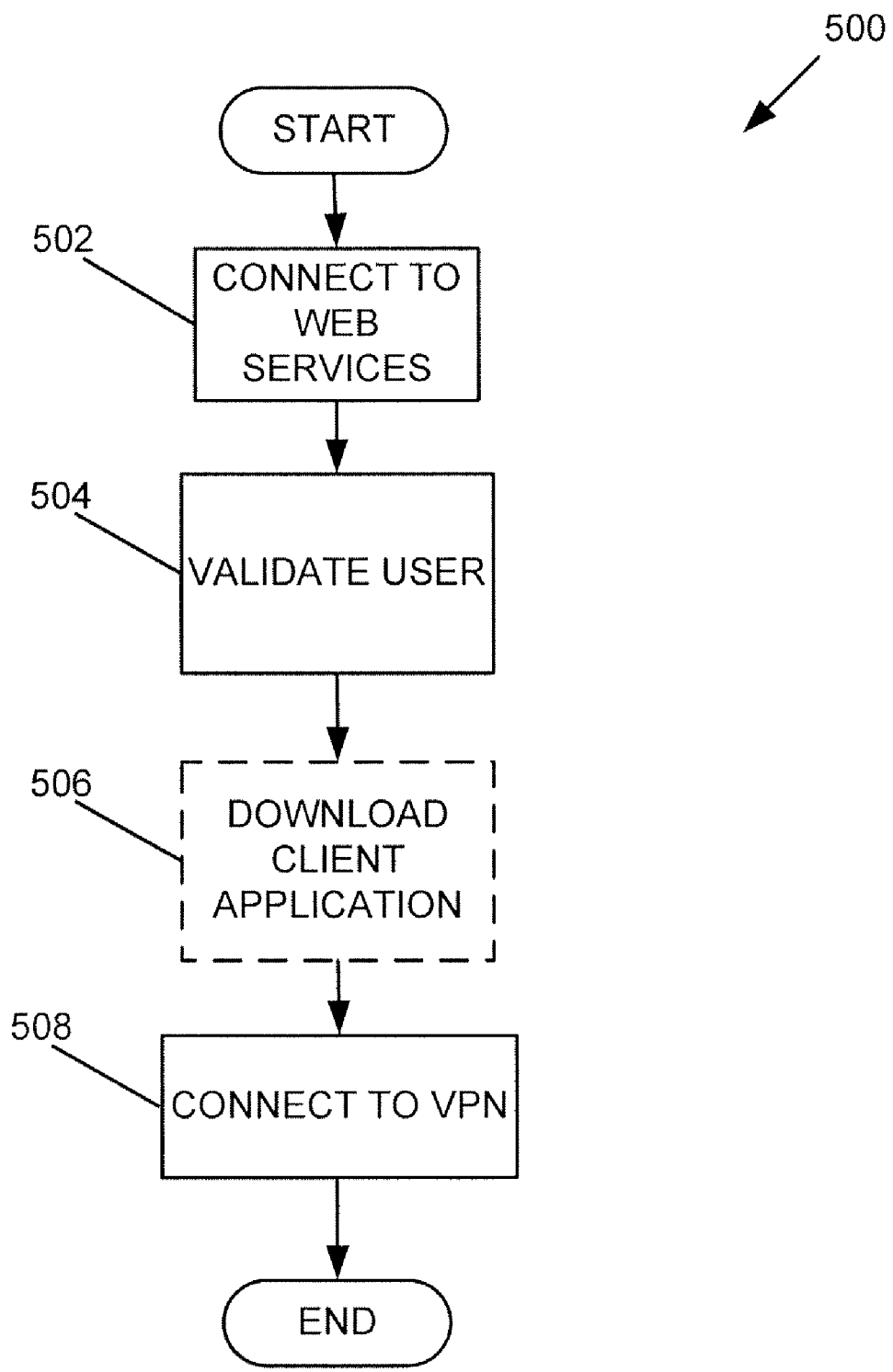
FIG. 5 is a flow diagram representing an embodiment of a method for providing a secure communications session between a remote agent's computer and a customer service provider's network.

An embodiment of a method 500 for providing a secure communications session between a remote agent's computer and a network is shown in FIG. 5. Connect to web services operation 502 connects a computer, such as remote agent computer 202 (FIG. 2), to a web service, such as web application 220 (FIG. 2). In one embodiment, the computer connects to a web service after loading a read-only bootable media, such as read-only bootable media 208 (FIG. 2). In other embodiments, remote agent computer 202 may connect to a web service before loading read-only bootable media 208 to download a customizable operating system. In yet another embodiment, remote agent computer 202 may connect to a web service while loading read-only bootable media 208.

Validate user operation 504 validates a user. In an embodiment, a web service provider, such as customer service provider 216 (FIG. 2), validates the user connecting to the web service. In some embodiments, the validate user operation 504 occurs after create user operation 412 (FIG. 4). Validate user operation 504 validates the user based upon the user profile created in create user operation 412 (FIG. 4). In other embodiments, validate user operation 504 may perform validation before create user operation 412 (FIG. 4). Validate user operation 504 may authenticate and authorize the user connecting to the web services. In some embodiments, authentication requires the user to provide authentication information, which may include, but is not limited to, entering a password, providing personal knowledge, providing a DNA sample, providing a retinal scan, providing a fingerprint, providing a security card, or providing any other form of authentication known in the art. In alternate embodiments, authorization may take the form of checking to ensure that the user is allowed to connect to the web services, confirming authorization via email, or any other method of authorization known in the art.

Optional download client application operation 506 (shown in dashed lines) downloads client applications onto the agent computer, such as agent computer 106 (FIG. 1) or remote agent computer 202 (FIG. 2), from the web services, such as web application 220 (FIG. 2). In some embodiments the client applications may include, but is not limited to, software applications, such as chat applications, security applications, help tools, applications that allow customer service provider 216 to take over and control the agent's computer, word processors, spread sheet applications, email applications, or any other type of software application that the agent may need to provide service to a customer. In yet another embodiment, the client applications may comprise software updates.

Connect to VPN operation 508 connects the computer, such remote agent computer 202 (FIG. 2), and the web service provider, such as customer service provider 216 (FIG. 2). In some embodiments, remote agent computer 202 and web service provider 216 establish a virtual private network ("VPN") for communications. In one embodiment, connect to VPN operation 508 establishes a private communication connection, such as tunnel 214 (FIG. 2). In other embodiments, connect to VPN operation 508 establishes a secure communication using a secure protocol, which may include, but is not limited to, SSL, SHTTP, or any other type of secure communications protocol known to the art.

Figure 6:
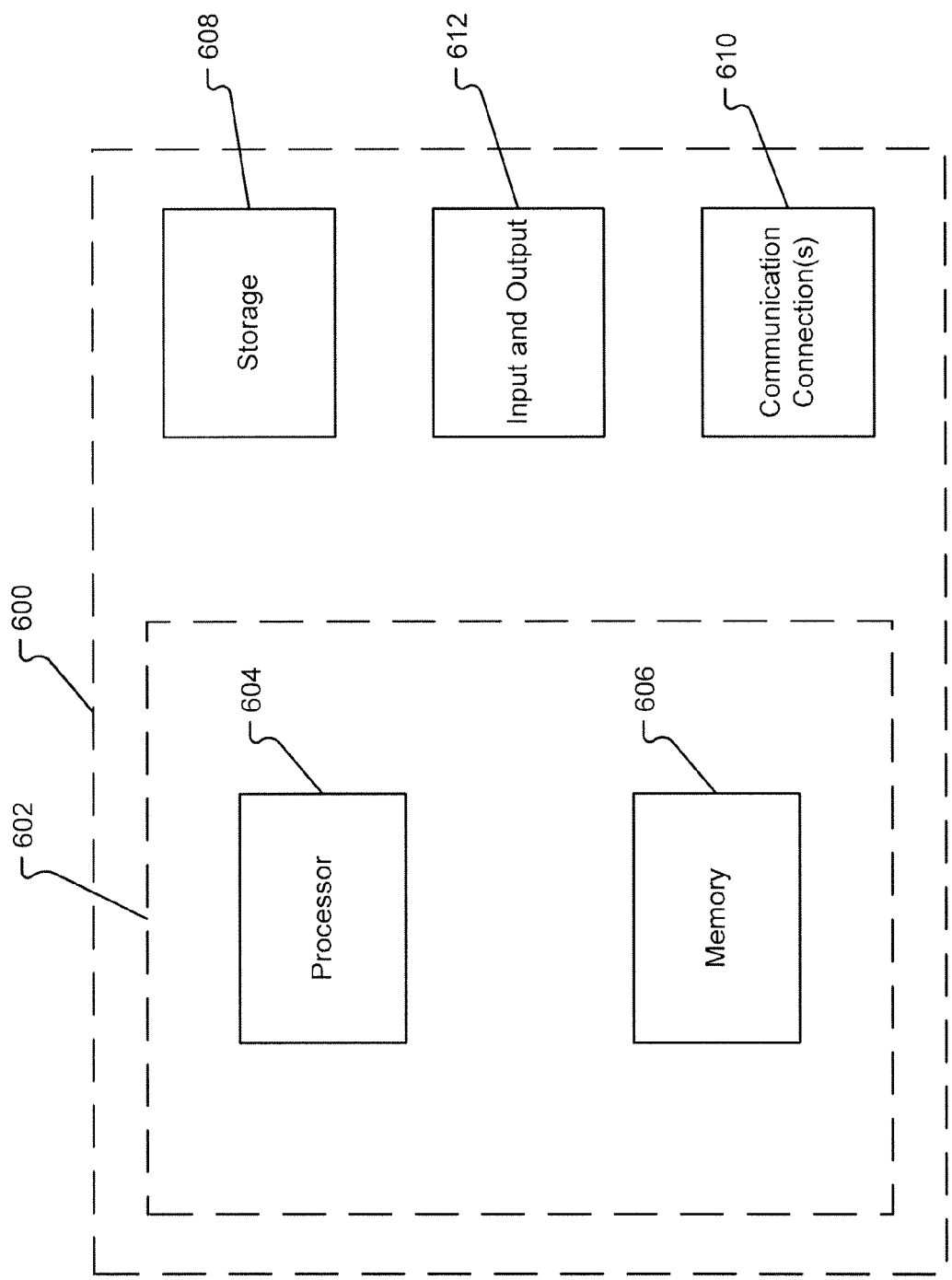
FIG. 6 is a functional diagram illustrating a computer environment and computer system operable to execute the read-only bootable media.

With reference to FIG. 6, an embodiment of a computing environment for implementing the various embodiments described herein includes a computer system, such as computer system 600. Any and all components of the described embodiments may execute as or on a client computer system, a server computer system, a combination of client and server computer systems, a handheld device, and other possible computing environments which include remote agent computer 202 (FIG. 2), servers housing web application 220 (FIG. 2), LDAP server 226 (FIG. 2), data store 224 (FIG. 2), and the other systems described herein. As such, a basic computer system applicable to all these environments is described hereinafter.

In its most basic configuration, computer system 600 comprises at least one processing unit or processor 604 and system memory 606. The most basic configuration of the computer system 600 is illustrated in FIG. 6 by dashed line 602. In some embodiments, one or more components of the described system are loaded into system memory 606 and executed by the processing unit 604 from system memory 606. Depending on the exact configuration and type of computer system 600, system memory 606 may be volatile (such as RAM), non-volatile (such as ROM, flash memory, etc.), or some combination of the two. In one embodiment, the non-volatile memory is electronically disconnected from the computer system 600 upon loading the read-only bootable media 104 (FIG. 1) or read-only bootable media 208 (FIG. 2).

Additionally, computer system 600 may also have additional features/functionality. For example, computer system 600 includes additional storage 608, such as removable and/or non-removable storage, including, but not limited to, magnetic or optical disks or tape. In some embodiments, software or executable code and any data used for the described system is permanently stored in storage 608. In some embodiments, any non-volatile additional storage 608 is electronically disconnected from the computer system 600 upon loading the read-only bootable media 104, 208. Storage 608 includes volatile and non-volatile, removable and non-removable media implemented in any method or technology for storage of information such as computer readable instructions, data structures, program modules, or other data. By way of example, not limitation, some computing devices used in one embodiment include remote agent computer 106, 202.

System memory 606 and storage media 608 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, other magnetic storage devices, or any other medium which is used to store the desired information, for example, the read-only bootable media 208 (FIG. 2), and which is accessed by computer system 600 and processor 604. Any such computer storage media may be part of computer system 600. In some embodiments, the remote agent computer 202 (FIG. 2) would include such computer storage media, however the non-volatile computer storage media would be electronically disconnected from remote agent computer 202 (FIG. 2) upon loading of read-only bootable media 208 (FIG. 2). Also, in some embodiments, data store 224 (FIG. 2) is also one of such computer storage media.

Computer system 600 may also contain communications connection(s) 610 that allow the device to communicate with other devices. In some embodiments, the communication s connection(s) 610 are used to connect the customer with information over the described systems and networks, for example, the Internet or tunnel 214 (FIG. 2), that remote agent computer 202 may use to communicate with customer service provider 216 (FIG. 2). Communication connection(s) 610 is an example of communication media. Communication media may embody a modulated data signal, such as a carrier wave or other transport mechanism and includes any information delivery media, which may embody computer readable instructions, data structures, program modules, or other data in a modulated data signal. The term "modulated data signal" means a signal that has one or more of its characteristics set or changed in such a manner as to encode information or a message in the data signal. By way of example, and not limitation, communication media includes wired media such as a wired network or direct-wired connection, and wireless media such as an acoustic, RF, infrared, and other wireless media. In an embodiment, remote agent computer 202 (FIG. 2), servers storing web application 220 (FIG. 2), LDAP server 226 (FIG. 2), data store 224 (FIG. 2) and any other device that is in communication with another device would include communication connection(s) 610.

In some embodiments, computer system 600 also includes input and output connections 612, and interfaces and peripheral devices, such as a graphical user interface. Requests from customers are selected with user input device(s) connected to input and output connections 612, and the information returned is displayed with output device(s) connected to input and output connections 612. The agents also utilize input device(s) and output device(s) via input and output connections 612 when interacting with customers. Input device(s) are also referred to as user interface selection devices and include, but are not limited to, a keyboard, a mouse, a pen, a voice input device, a touch input device, etc. Output device(s) are also referred to as displays and include, but are not limited to, cathode ray tube displays, plasma screen displays, liquid crystal screen displays, speakers, printers, etc. These devices, either individually or in combination, connected to input and output connections 612 are used to display the information as described herein. All these devices are well known in the art and need not be discussed at length here. In some embodiments, agent computer 106 or remote agent computer 202 and any other device operated by humans would include some type of input and output connections 612.

In some embodiments, the component described herein comprise such modules or instructions executable by computer system 600 that may be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some embodiments, computer system 600 is part of a network that stores data in remote storage media for use by the computer system 600. In some embodiments, the described components executing on a client system may receive data from or store data to remote databases.

This disclosure described some embodiments of the present invention with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art.

An illustration of an embodiment of the method and system at work will aid in fully understanding the invention. A customer service provider, such as customer service provider 102 (FIG. 1), sends a read-only bootable media, such as read-only bootable media 104 (FIG. 1), to an employee, such as an agent. The customer service provider 102 (FIG. 1) may send the read-only bootable media 104 via mail, hand delivery, or an electronic transmission which the agent may download and write to a read-only bootable media 104, such as a CD-ROM, a read-only flash drive, or a read-only hard drive. In other embodiments, the read-only bootable media 104 (FIG. 1) is further encrypted in which a key may be downloaded from customer service provider 102 (FIG. 1).

When the agent begins work, the agent loads the read-only bootable media 104 on to his or her computer. The read-only bootable media 104 loads a customized operating system onto the agent computer 106 (FIG. 1). The read-only bootable media 104 (FIG. 1) also disables the use of any persistent or non-volatile storage, such as a hard drive in electrical communication with the agent computer or a printer, as well as any devices with persistent or non-volatile storage. Disabling persistent or non-volatile storage ensures that any malicious software or hardware contained on agent computer 106 (FIG. 1) cannot execute during the agent's working session. This disabling action also protects both the confidential client information and the customer service provider's 102 network. Drivers necessary for the agent to complete his or her job, such as drivers for a monitor and keyboard are loaded into the RAM memory on remote agent computer 106 from the read-only bootable media 104. Because non-volatile storage is disconnected from agent computer 106 (FIG. 1) by read-only bootable media 104 (FIG. 1), the customizable operating system, such as operating system 206 (FIG. 2), must reside within volatile storage, such as the agent computer's RAM. After loading the operating system 206 (FIG. 2), client applications 204 (FIG. 2) are loaded onto the remote agent computer 202 (FIG. 2) from the read-only bootable media 208 (FIG. 2).

At this point, the read-only bootable media creates a user profile for the agent and sets agent privileges. The privileges are set such that the agent does not have access to the root terminal of the operating system. This limitation to user activity ensures that the agent cannot circumvent the security set in place by the operating system 206. By disabling persistent storage and disallowing the agent to access the security features of the operating system 206, confidential client information is protected against agent misuse or retention. After downloading client applications 204 (FIG. 2), remote agent computer 202 (FIG. 2) connects to web application 220 (FIG. 2) over a network, such as network 210 (FIG. 2). Web application 220 (FIG. 2) verifies the identity of the agent by performing authentication and authorization on remote agent computer 202 (FIG. 2). Authentication and authorization is performed by LDAP server 226 (FIG. 2) and security information 228 (FIG. 2).

After completing authentication and authorization, a secure communication, such as tunnel 214 (FIG. 2) is established to provide communication between remote agent computer 202 (FIG. 2) and customer service provider 216 (FIG. 2). Tunnel 214 (FIG. 2) connects to VLAN 218 (FIG. 2) which connects remote agent computer 202 (FIG. 2) to servers and data stores, such as data store 224 (FIG. 2), used for the agents working group. For example, if the agent works in sales, VLAN 218 (FIG. 2) connects remote agent computer 202 only to servers and data stores 224 used by the sales group. This isolation provides further security for the customer service provider 216 (FIG. 2) network.

After establishing tunnel 214 (FIG. 2), updates or additional client applications 204 may be downloaded to remote agent computer 202 (FIG. 2). At this point, a secure working environment is established in which the agent can begin work without compromising the security of remote agent computer 202 (FIG. 2) or the customer service provider 216 (FIG. 2) network. Establishing a secure working environment provides the benefit of securely transmitting confidential client and provider information. Such information is protected from viruses contained on the agent computer, as well as from misuse by the agent.

Additional benefits provided by client applications 204 (FIG. 2) include the ability for supervisors located at customer service provider 216 (FIG. 2) to provide training and help to the agent by allowing the supervisors to remotely take control of remote agent computer 202 (FIG. 2). Additionally, client applications 204 provide speech communications over remote agent computer 202 (FIG. 2). Such communication may be provided over a Voice over IP network ("VoIP"). This system allows the agent to communicate with customers without requiring the agent to provide a separate telephone line.

Although the embodiments have been described in language specific to structural features, methodological acts, and computer-readable media containing such acts, it is to be understood that the possible embodiments, as defined in the appended claims, are not necessarily limited to the specific structure, acts, or media described. One skilled in the art will recognize other embodiments or improvements that are within the scope and spirit of the present invention. Therefore, the specific structure, acts, or media are disclosed only as illustrative embodiments. The invention is defined by the appended claims.

What is claimed is:

1. A non-transitory computer readable storage medium having computer-executable instructions for performing a method in a computer system to provide a secure working environment between an agent computer and a customer service provider, the method comprising the steps of:
   running an operating system from a read-only bootable media in a volatile memory of the agent computer;
   loading a set of computer instructions from said read-only bootable media into said volatile memory, said set of computer instructions causing the agent computer to run in a secure mode, wherein all persistent storage on the agent computer is disabled;
   establishing communication between the agent computer and the customer service provider;
   initiating an agent session to allow the agent computer to perform a job function associated with the customer service provider, wherein upon termination of the agent session, no permanent changes have been made to the persistent storage of the agent computer; and
   downloading at least one client application from the customer service provider into the volatile memory of the agent computer, wherein the at least one client application is an application allowing speech communication between an agent and a client via the agent computer.

2. The method of claim 1 further comprising the step of:
   loading at least one client application from said read-only bootable media into said volatile memory of the agent computer.

3. The method of claim 1 further comprising the step of:
   communicating between the agent computer and the customer service provider through a virtual local area network.

4. The method of claim 1 further comprising the step of:
   communicating between the agent computer and the customer service provider over a secure communication connection.

5. The method of claim 4, wherein said secure communication connection is a virtual private network.

6. The method of claim 4 further comprising the step of:
   remotely controlling the agent computer by the customer service provider via said secure communication connection for training purposes.

7. The method of claim 4 further comprising the step of:
   monitoring the agent computer by the customer service provider via said secure communication connection.

8. A method for providing a secure working environment between an agent computer and a customer service provider, the method comprising the steps of:
   running an operating system from a read-only bootable media in a volatile memory of the agent computer to begin an agent session;
   disconnecting all persistent storage on the agent computer;
   connecting the agent computer to the customer service provider, wherein upon termination of the agent session, no permanent changes have been made to the persistent storage on the agent computer; and
   downloading a plurality of client applications from the customer service provider into the volatile memory of the agent computer, wherein said plurality of client applications includes an application allowing speech communication between an agent and a client via the agent computer.

9. The method of claim 8 further comprising the step of:
   loading a plurality of client applications from said read-only bootable media into said volatile memory of the agent computer.

10. The method of claim 8 further comprising the step of:
    communicating between the agent computer and the customer service provider over a secure communication connection.

11. The method of claim 10, wherein the secure communication connection is a virtual private network.

12. The method of claim 10 further comprising the step of:
    remotely controlling the agent computer by the customer service provider via said secure communication connection for training purposes.

13. The method of claim 10 further comprising the step of:
    monitoring the agent computer by the customer service provider via said secure communication connection.

14. The method of claim 8 further comprising the step of:
    communicating between the agent computer and the customer service provider through a virtual local area network.

15. The method of claim 8 further comprising the step of:
    loading any drivers from said read-only bootable media into said volatile memory that are necessary for said agent computer to perform a job function associated with the customer service provider.

16. A method for providing a secure computer working environment, the method comprising the steps of:
    providing an agent with a read-only bootable media, wherein said read-only bootable media is delivered to the agent;
    loading the read-only bootable media into a volatile memory of an agent computer to begin an agent session;
    running a customized operating system in said volatile memory of said agent computer, wherein said customized operating system is loaded into the volatile memory of the agent computer from said read-only bootable media;
    disconnecting any device drivers for any persistent storage devices;
    establishing a secure communication connection between said agent computer and a customer service provider;

receiving a phone call from a customer at said customer service provider;

connecting said agent computer to said customer via said phone call, wherein upon termination of the agent session, no permanent changes have been made to the persistent storage devices; and downloading at least one client application from the customer service provider into the volatile memory of the agent computer, wherein the at least one client application is an application allowing speech communication between an agent and the customer via the agent computer.

17. The method of claim 16 wherein providing said agent with a read-only bootable media further comprises the step of:

transferring a modulated data to said agent computer via a network, wherein said agent computer writes said modulated data to said read-only bootable media.

18. A system for providing a secure computer working environment between an agent computer and a customer service provider, the system comprising:

a processor in the agent computer;

a volatile memory in electrical communication with the processor, the volatile memory comprising computer-executable modules for executing in the processor, the computer-executable modules comprising:

a customized operating system residing in the volatile memory, wherein the customized operating system is run in the volatile memory from a read-only media to begin an agent session;

a disabling module in electrical communication with the customized operating system for disabling drivers for devices with persistent storage in electrical communication with the agent computer;

an application module residing in the volatile memory, wherein the application module contains client applications for use in providing customer service;

a communication module, wherein the communication module connects to a secure network connection, wherein upon termination of the agent session, no permanent changes have been made to the persistent storage of the devices in electrical communication with the agent computer; and at least one client application downloaded from the customer service provider into the volatile memory of the agent computer, wherein the at least one client application is an application allowing speech communication between an agent and a client via the agent computer.

19. The system of claim 18, wherein the communication module connects the agent computer to the customer service provider.

* * * * *